United States Patent [19]
Housayama

[11] 3,722,912
[45] Mar. 27, 1973

[54] FOLDING BICYCLE

[75] Inventor: Akira Housayama, Komaki, Japan

[73] Assignee: Tsunoda Jitensha Kabushiki Kaisha, Nagoya-shi, Aichi-ken, Japan

[22] Filed: Feb. 5, 1971

[21] Appl. No.: 112,908

[30] Foreign Application Priority Data

Feb. 6, 1970 Japan................45/4510784

[52] U.S. Cl. ............280/287, 280/278, 287/98, 287/99, 292/106, 292/207, 292/333
[51] Int. Cl. ..................................B62k 15/00
[58] Field of Search ......280/287, 278; 292/333, 106, 292/207; 287/98, 99

[56] References Cited

UNITED STATES PATENTS

| 569,354 | 10/1896 | Ryan | 280/287 |
|---|---|---|---|
| 1,090,305 | 3/1914 | Hoffman | 292/333 X |
| 3,184,261 | 5/1965 | Young | 287/99 X |
| 3,596,945 | 8/1971 | Muluin | 287/99 |
| 1,724,694 | 8/1929 | Chamberlain | 287/99 |
| 3,362,725 | 1/1968 | Dolphin | 280/287 |
| 3,294,416 | 12/1966 | Carnielli | 287/99 X |
| 599,016 | 2/1898 | Ryan | 280/287 |
| 2,394,494 | 2/1946 | Schwinn | 287/99 |
| 2,705,156 | 3/1955 | Torre | 280/287 |
| 530,406 | 12/1894 | Flocke | 292/333 |
| 1,585,144 | 5/1926 | Hannebohn | 292/333 X |
| 3,229,797 | 1/1966 | Stackhouse | 292/333 X |

Primary Examiner—Benjamin Hersh
Assistant Examiner—John P. Silverstrim
Attorney—Moonray Kojima

[57] ABSTRACT

Disclosed herein is a folding device for a folding bicycle, according to which a strut is secured on a rear body frame carrying a rear road wheel, a saddle and a crank-pedal thereon and connecting means is mounted on the strut to connect swingably a front body frame carrying a front road wheel to the strut. Provided also to complete the device for simple and easy folding and unfolding works are locking means to have the front body frame fasten to the strut, holding means to maintain the releasing position of the locking means, and a resilient member to hold the fastening position of the locking means.

7 Claims, 4 Drawing Figures

Patented March 27, 1973  3,722,912
3 Sheets-Sheet 1
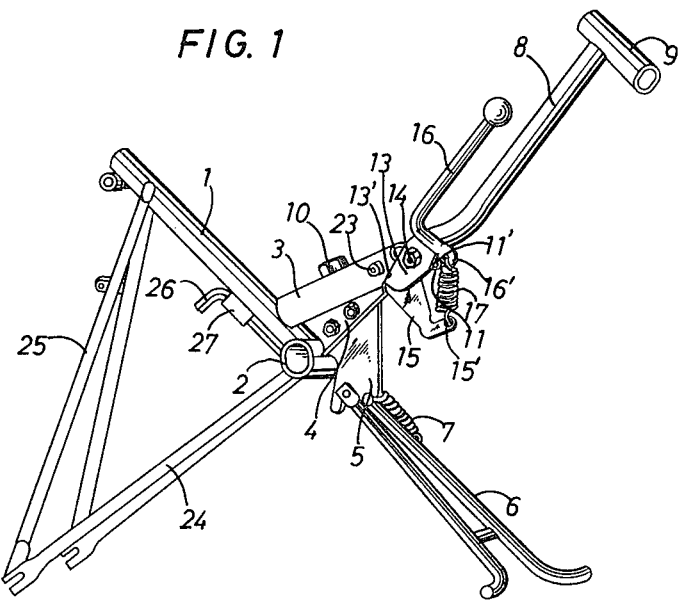
FIG. 1
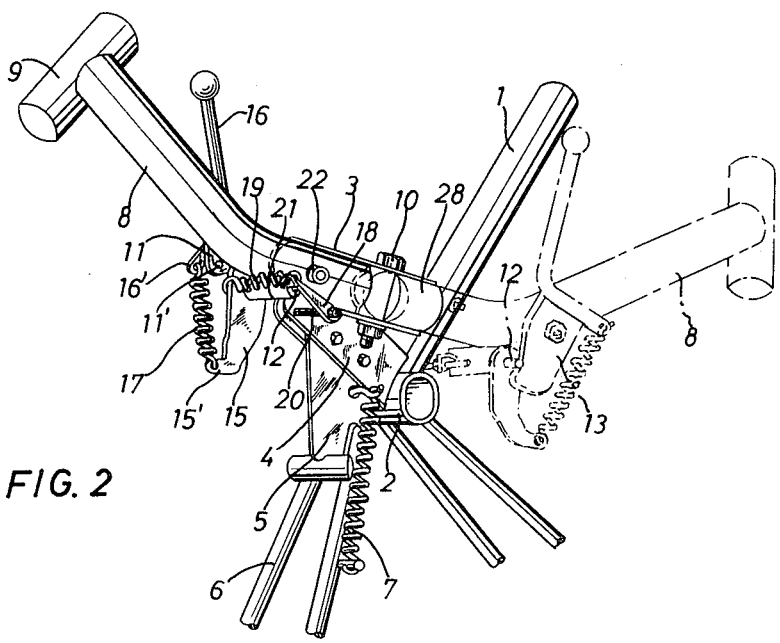
FIG. 2
INVENTOR
AKIRA HOUSAYAMA
BY 
ATTORNEY Patented March 27, 1973

INVENTOR
AKIRA HOUSAYAMA

BY
ATTORNEY

FOLDING BICYCLE

The present invention relates to a folding bicycle, and more particularly to a folding device for the body frame of the folding bicycle.

For folding bicycles heretofore in use, bolts and nuts have been adopted to fasten and release foldable body frames. The mentioned fastening and releasing means require, however, such regular tools as spanners, screw-drivers, and the likes or special tools for fastening and releasing the body frames of the folding bicycles. This makes the fastening and releasing works very complicate, troublesome and time-taking.

It is, therefore, an important object of the present invention to provide a folding device for the folding bicycle, which is capable of redering easy and simple folding works only by simple operation of an operation lever provided on the device, one opening work of the folded frames assembling firmly and automatically the folding bicycle to be ready for use.

It is another important object of the present invention to provide a folding device having the above-mentioned features, wherein the device is made in very simple construction and yet very durably with very few occasions to be out of order.

The folding device for a folding bicycle constructed in accordance with the present invention comprises, therefore, a front body frame for carrying a front road wheel, and a rear body frame for carrying a rear road wheel and mounting a saddle on one end thereof and a crank-pedal on the other end thereof. A strut is secured on the lower portion of the rear body frame so as to receive and hold the lower end portion of the front body frame when the bicycle is set up. And provided further to complete the folding device are locking means, holding means, and a resilient member respectively to lock the front body frame with the strut, to maintain the releasing position of the locking means, and to hold the fastening position of the locking means.

The above-described and other objects and features of the present invention will become more clear from the following detailed description, especially when read in conjunction with the accompanying drawings, in which FIG. 1 is a left-side perspective view of the folding device in accordance with the present invention;

FIG. 2 is a right-side perspective view of the device in FIG. 1, being drawn out in a larger size;

Figure 3:
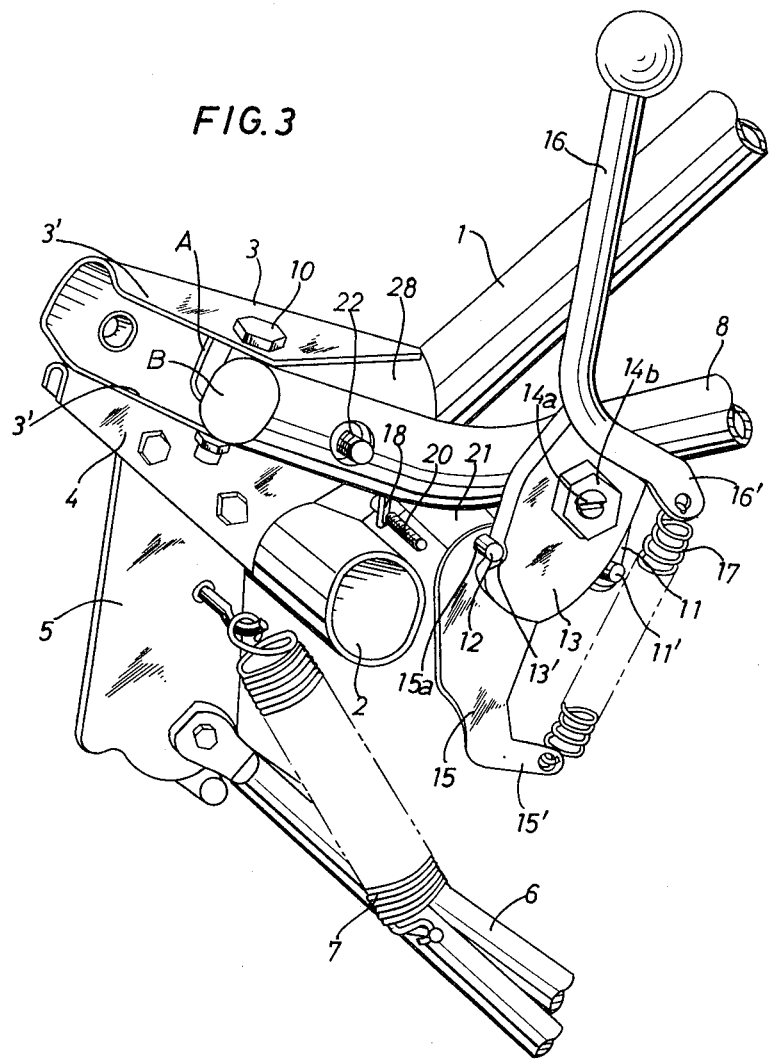
FIG. 3 is an enlarged right-side perspective view of the device in FIG. 1.

Now referring to the drawings, in FIGS. 1 and 2, there is shown a rear body frame 1 for carrying a rear road wheel and a saddle is to be mounted at the upper end portion thereof. A crankshaft receiver pipe 2 for a crank-pedal is secured on the lower end of the rear body frame 1 and a short branch-pipe 28 extends from a portion slightly upper than the crankshaft receiver pipe 2 on the rear body frame 1. The left half of the circumference of the short branch-pipe 28 is covered with a cover-member 3 which is welded on the rear body frame 1 and the short branch-pipe 28, the cover-member or bracket 3 being shaped to have a dull U-letter cross-section. The two sides of the U-letter cross-section of the bracket 3 becomes longest at the central portion of the bracket 3 as shown with reference numerals 3', 3' in FIG. 3. A gusset stay 4 is adopted to connect the bottom side of the bracket 3 to the crankshaft receiver pipe 2 so as to have the bracket 3 secured firmly onto the rear body frame 1. The gusset stay 4 has a perpendicular plate 5 fixed thereon and a central foldable stand 6 is held on the perpendicular plate 5 by means of a spring 7 stretched between a hook on the perpendicular plate 5 and a boss on the central foldable stand 6.

A front body frame 8 to carry a front road wheel is welded at the lower end thereof onto a pivot shaft 10 put through holes provided on the longest portions 3', 3' of the bracket 3. A head pipe 9 is secured on the top end of the front body frame 8. Thus, the front body frame 8 is assembled swingably having the pivot shaft 10 for the swinging fulcrum. When the bicycle is set up for use, the connecting base portion of the front body frame 8 engages into the bracket 3 to have the top-tip thereof get in touch with the top-tip of the short branch pipe 28 as shown with solid lines in FIG. 2. And the dot and dash lines in FIG. 2 shows when the front body frame 8 is swung toward the rear body frame 1 at an angle of 180 degree. This means that the bicycle is folded up.

A plate piece 11 is welded on the lower left side of the front body frame 8, the plate piece 11 provided with a stopper pin 11' jutting out from the lower front portion thereof. On the upper out side portion of the plate piece 11, a rotation hook 13 is journaled by a bolt 14a jutting out from the plate piece 11 and a nut 14b threaded on the bolt 14a, the rotation hook 13 having a recess 13' at the lower back side thereof and a lever handle 16 welded in a piece at the upper end thereof as best shown in FIG. 3.

Figure 4:
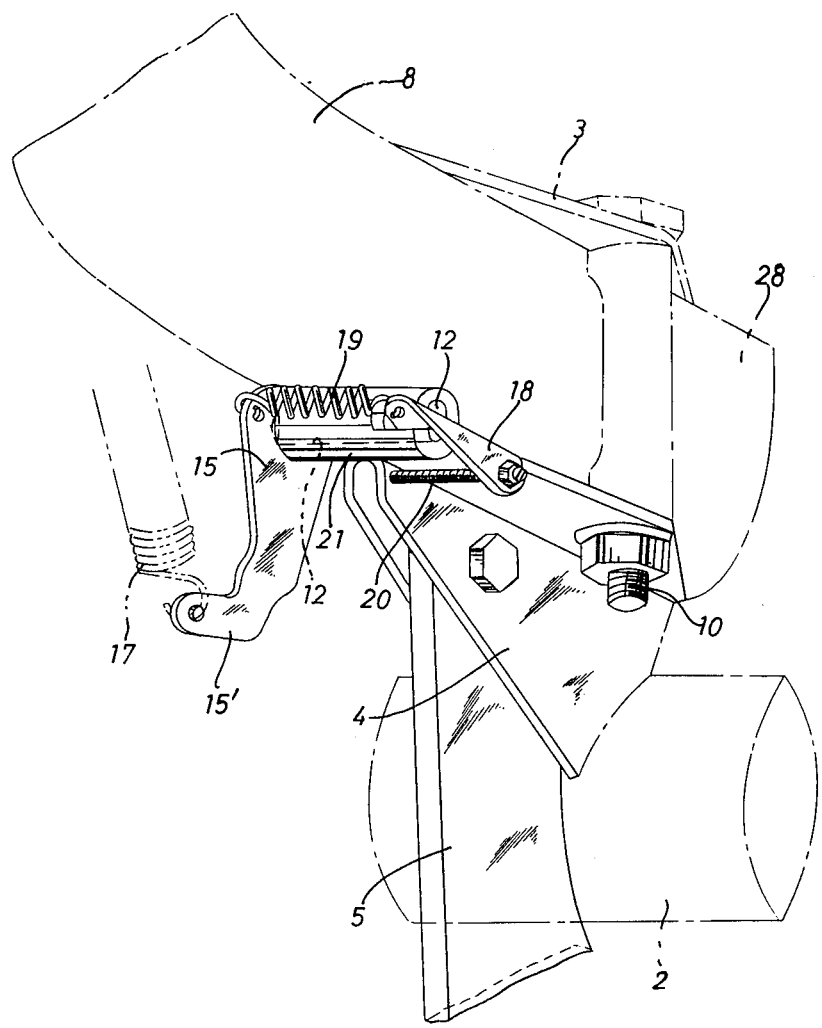
FIG. 4 is an enlarged perspective view of the slide stop pin operation portion of the device in FIG. 1.

A guiding pipe 21 is firmly secured on the bottom side of the base portion of the front body frame, and on the left side edge of the guiding pipe 21 a perpendicular hook member 15 with a curved lower end portion 15' is firmly secured at the upper end thereof. A slide stop pin 12 is inserted axially movably into the bore of the guiding pipe 21, having the top end portion jut out through a hole 15a drilled on the upper portion of the perpendicular hook member 15 and the back end welded in a piece on the central portion of a fixing member 18. A coil spring 19 is stretched between one end of the fixing member 18 and the upper end of the perpendicular hook member 15 and a bar 20 jutting inward is secured on the other end of the fixing member 18 as best illustrated in FIG. 4. A spring 17 is stretched between a curved end portion 16' of the lever handle 16 and the curved lower end 15' of the hook member 15.

Connecting end faces A and B respectively of the short branch pipe 28 and the front body frame 8 as referred to FIG. 3, stay in full contact each other while the front and rear body frame 8 and 1 are set up. This makes the bar 20 urged against the right side of the gusset stay 4, which, in turn, keeps the coil spring 19 pulled to have the fixing member 18 stay slightly rightward as well shown in FIG. 4. Consequently, the slide stop pin 12 disengage from the recess 13' of the rotation hook 13 and returning resilient force of the spring 17 keeps the lever handle 16 pulled down forward. At this moment, the lower portion of the rotation hook 13 made in one piece with the lever handle 16 is strongly urged against the left side of the top portion of the bracket 3. This situation prevents the front body frame 8 from swinging to be folded up, the bicycle being firmly and completely assembled for use.

So as to fold the bicycle, the lever handle 16 is to be pulled up which rotates the rotation hook 13 to come off from the outer side portion of the bracket 3. Then, while the lever handle 16 being kept as pulled up, the front body frame 8 is swung round with the pivot shaft 10 as the rotation fulcrum. A slight swing of the front body frame 8 has the bar 20 come off from the gusset stay 4 to move the fixing member 18 leftward. This juts the top portion of the slide stop pin 12 out through the hook member 15 by the action of the spring 19 as shown in FIG. 3. The engagement between the slide stop pin 12 and the recess 13' of the rotation hook 13 is maintained by the spring 17 while the top portion of the slide stop pin 12 juts out. Thus, the actuation onto the lever handle 16 can be removed, and yet the bicycle can be folded by the continous swinging movement of the front body frame 8 with the pivot shaft 10 as the rotation fulcrum.

Now to set up the bicycle, one simple work is required to manualy swing the front body frame 8 with the rotation fulcrum of the pivot shaft 10. While the base end of the front body frame 8 is being pushed into the inside of the bracket 3, the bar 20 gets in touch with the gusset 4 to have the fixing member 18 move outward against the resilient force of the spring 19. This retracts the slide stop pin 12 which disengages then from the recess 13' of the rotation hook 13. At this time, the resilient force of the spring 17 rotates the rotation hook 13 which is now urged strongly against the outer side portion of the bracket 3 with the lever handle 16 pulled down.

Furthermore, a stopper screw 22 is put through the base portion of the front body frame 8 and a nut 23 is provided on the corresponding portion of the bracket 3. And when the stopper screw 22 is threaded into the nut 23 by a fastening bar 26 constantly held within a holding pipe 27, the front and rear body frames 8 and 1 can more firmly be held. Reference numerals 24 and 25 indicate respectively a chain-stay and a back fork.

As described above in detail, the present invention has such novel features that a single pulling operation of the lever handle enables to fold easily the bicycle and a swinging operation of the front body frame assembles up the bicycle automatically yet very firmly.

It is understood that within the principle of the present invention various details can be widely modified from the preferred embodiment described and illustrated in the above without departing from the spirit and scope of the present invention.

What is claimed is:

1. A folding device for a folding bicycle comprising a front body frame for carrying a front road wheel, a rear body frame for carrying a rear road wheel and mounting a saddle and a crank-pedal thereon, a strut secured on the lower portion of said rear body frame, connecting means for pivotally connecting the lower end portion of said front body frame to said strut whereby in the folded position of said bicycle said front body frame swings toward said rear body frame, locking means for locking said front body frame to said strut in the unfolded position of said bicycle, holding means for maintaining a released position of said locking means, and a resilient member for biasing said locking means to the locking position, said holding means comprising a guiding pipe having an axis and firmly secured on the bottom side of said front body frame and a slide stop pin installed axially of said axis and movably in the bore of said guiding pipe, whereby said stop pin engages and holds said locking means in said released position when said front body frame is in said folded position, and said stop pin is automatically disengaged from holding said locking means when said front body frame is moved to said unfolded position.

2. A device for folding and unfolding a bicycle having a rear frame with an extension and a front frame, said device comprising
   first plate means movably attached to said front frame;
   lever means attached to said first plate means and manually movable to a first position and a second position to cause said first plate means to move to a first position and a second position, respectively;
   means for pivotally connecting said front frame to said extension whereby said front frame may be pivoted between a folded and an unfolded position;
   first spring means attachable to said front frame for biasing said lever means to said first position;
   locking means for enabling said first plate means to be locked in said second position
   said extension comprising a hollow bracket for holding said front frame, said hollow bracket forming a second plate means arranged in a position to be substantially parallel with said first plate means when said bicycle is in said unfolded postion, whereby said first plate means engages said second plate means in said first position;
   said locking means comprising
   a. hollow means attached to said front frame,
   b. a first rod contained within said hollow means,
   c. second spring means,
   d. a second rod connected to said second spring means,
   e. whereby when said front frame is in said folded position, said second spring means biases said first rod into locking engagement with said first plate means in said second position, and when said front frame is moved to said unfolded position, said second rod abuts said second plate, causing said second spring means to release said first rod from said locking engagement with said first plate means enabling said first spring means to move said first plate means to said first position.

3. The device of claim 2, further comprising means attachable to said hollow means for holding said first spring means.

4. The device of claim 2, wherein said rear frame has a holding means attached thereto, and wherein said first plate means is locked in said first position against said holding means with said second rod of said locking means in contact with said second plate means.

5. In a folding bicycle comprising a rear frame portion for holding a rear wheel, a seat and a crankshaft holder, and a front portion for holding a front wheel and a handle bar, the combination comprising
   extension means attached to said rear frame;

a semicircular bracket means fixedly attached to said extension;

pivot means for pivotally holding said front frame against said extension and within said bracket means;

bolt means attached to said front frame for locking said front frame to said holding means when said bicycle is in an unfolded condition;

first plate means movably mounted on said front frame; lever means attached to said first plate means for moving said first plate means between a first and a second position;

said lever means in said first position causing said first plate means to be locked against said bracket means thereby resulting in said unfolded condition of said bicycle, and in said second position causing said first plate means to be out of contact with said bracket means thereby resulting in a folded condition of said bicycle with said front frame pivotally moved toward said rear frame;

means operable by said lever means for biasing said first plate means against said bracket means in said unfolded condition of said bicycle; and said lever means in said second position moving said first plate means out of said locked position with said bracket means whereby said front frame is rotated about said pivot means and toward said rear frame, said lever means thereupon locking said first plate means in a second position when said bicycle is in said folded position.

6. The combination of claim 5, wherein said last mentioned means comprises
1. a hollow core piece;
2. a rod disposed within said hollow core and laterally moveable therein;
3. a spring means attached to said front frame;
4. and a second rod attachable to said spring means and said first rod, said spring means holding said first and second rods normally in a first position.

7. In a folding bicycle comprising a rear frame portion for carrying a rear wheel, a seat and a crankshaft holder, and a front frame portion for holding a front wheel and a handle bar, the combination comprising an extension member secured on the lower portion of said rear frame above said crankshaft holder;

a semicircular bracket secured on a side of said extension member to receive and hold the lower end portion of said front frame in an unfolded condition of said bicycle;

hinge means for pivotally and transversely mounting said front frame within said bracket in said unfolded condition and away from said bracket and toward said rear frame in a folded condition of said bicycle;

a hook member vertically and rotatably mounted on a side of said front frame to cause locking between said front frame and said bracket when said front frame is received and held in said bracket, said hook member including a release handle lever secured thereon;

means for normally biasing said hook member to its locking position; and regulating means automatically responsive to said folded and unfolded positions, for holding the released position of said hook member after said hook member is vertically rotated to its released position and the front frame is moved to said folded position and for conditioning said hook member to its locking position when said front frame is moved to said unfolded condition of said bicycle.

* * * * *